US007941126B2

(12) United States Patent
Malik (10) Patent No.: US 7,941,126 B2
(45) Date of Patent: May 10, 2011

(54) METHODS, SYSTEMS, AND COMPUTER PROGRAM PRODUCTS FOR DELIVERING RING TONES ON A COMMUNICATION NETWORK BY ASSOCIATING RING TONES WITH MEDIA FILES

(75) Inventor: Dale Malik, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1098 days.

(21) Appl. No.: 11/303,669

(22) Filed: Dec. 16, 2005

(65) Prior Publication Data
US 2007/0140470 A1  Jun. 21, 2007

(51) Int. Cl.
*H04M 3/42* (2006.01)
*H04M 3/00* (2006.01)

(52) U.S. Cl. .................. 455/414.1; 379/374.01

(58) Field of Classification Search .............. 455/414.1, 455/557, 418, 419, 426.1, 3.05, 412, 413, 455/466, 517, 20, 410, 567, 435.1, 566, 422.1, 455/412.1, 414.4, 432.2, 433, 432.3, 415, 455/414.2, 414.3; 379/373.02, 374.01, 373.01, 379/271.02, 375.01, 355, 142.15, 142.01, 379/218.01, 88.13, 88.25, 88.11–88.18; 709/231, 709/203, 206, 246, 224, 1, 10, 217, 208, 709/204, 205, 225; 386/83; 705/10, 14; 719/328; 700/94
See application file for complete search history.

(56) References Cited

U.S. PATENT DOCUMENTS

| | | | | |
|---|---|---|---|---|
| 4,527,270 A * | 7/1985 | Sweeton | | 714/47 |
| 4,625,308 A * | 11/1986 | Kim et al. | | 370/321 |
| 4,644,351 A * | 2/1987 | Zabarsky et al. | | 340/7.21 |
| 5,034,976 A * | 7/1991 | Sato | | 379/111 |
| 5,142,693 A * | 8/1992 | Hanks et al. | | 455/508 |
| 5,224,095 A * | 6/1993 | Woest et al. | | 370/401 |
| 5,313,653 A * | 5/1994 | Sasuta | | 455/17 |
| 5,325,310 A * | 6/1994 | Johnson et al. | | 709/206 |
| 5,329,578 A * | 7/1994 | Brennan et al. | | 379/211.03 |
| 6,714,637 B1 * | 3/2004 | Kredo | | 379/215.01 |
| 6,778,648 B1 * | 8/2004 | Alston et al. | | 379/93.27 |
| 7,020,497 B2 * | 3/2006 | Deeds | | 455/567 |
| 7,319,858 B2 * | 1/2008 | Lewis | | 455/412.2 |
| 7,454,195 B2 * | 11/2008 | Lewis et al. | | 455/412.1 |
| 2002/0176404 A1 * | 11/2002 | Girard | | 370/352 |
| 2002/0193094 A1 * | 12/2002 | Lawless et al. | | 455/407 |
| 2003/0084121 A1 * | 5/2003 | De Boor et al. | | 709/218 |
| 2003/0113100 A1 * | 6/2003 | Hecht et al. | | 386/83 |
| 2003/0125957 A1 * | 7/2003 | Puterbaugh et al. | | 704/275 |
| 2003/0131353 A1 * | 7/2003 | Blom et al. | | 725/25 |

(Continued)

*Primary Examiner* — Melody Mehrpour
(74) *Attorney, Agent, or Firm* — Myers Bigel Sibley & Sajovec, P.A.

(57) ABSTRACT

Ring tones can be delivered on a communication network by associating one or more ring tones with a media file, such as a song, that may, for example, be purchased by a customer. The associated ring tones may be presented to a customer to allow the customer to choose which ring tone(s) he/she would like to have as well as to select how the ring tone(s) are to be delivered. For example, the ring tone(s) may be delivered directly to a phone using, for example, a Short Message Service (SMS) message. The ring tone(s) may also be delivered to a storage location, such as on a personal computer, for example, allowing the customer to install the ring tone(s) on his/her phone independently. A key may also be delivered to a storage location that allows the user to invoke the key at later time to trigger delivery of the ring tone(s) over the air via an SMS message.

36 Claims, 5 Drawing Sheets

U.S. PATENT DOCUMENTS

| | | | |
|---|---|---|---|
| 2003/0219110 A1* | 11/2003 | Tsai et al. | 379/373.01 |
| 2004/0067751 A1* | 4/2004 | Vandermeijden et al. | 455/414.1 |
| 2004/0105534 A1* | 6/2004 | Dezonno | 379/114.13 |
| 2004/0260824 A1* | 12/2004 | Berard et al. | 709/230 |
| 2005/0053218 A1* | 3/2005 | Kim | 379/211.02 |
| 2006/0276182 A1* | 12/2006 | Feng | 455/414.1 |
| 2007/0026852 A1* | 2/2007 | Logan et al. | 455/422.1 |
| 2007/0124583 A1* | 5/2007 | Andersson et al. | 713/165 |
| 2007/0127707 A1* | 6/2007 | Koser et al. | 379/373.03 |
| 2008/0034220 A1* | 2/2008 | Abu-Amara et al. | 713/189 |
| 2008/0066609 A1* | 3/2008 | Bourgeois | 84/609 |

\* cited by examiner

METHODS, SYSTEMS, AND COMPUTER PROGRAM PRODUCTS FOR DELIVERING RING TONES ON A COMMUNICATION NETWORK BY ASSOCIATING RING TONES WITH MEDIA FILES

FIELD OF THE INVENTION

The present invention relates to communications networks, and, more particularly, to distributing media on communications networks.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

Historically, music was sold to customers on vinyl albums or records or on tape. Music later was digitally recorded on compact disc for sale to customers. The Moving Pictures Experts Group (MPEG) encoding standard was developed that provided a format for coding audio and/or video files. The MPEG standard has been used to encode and compress media, such as music and audio, into files that can be more readily communicated over the Internet. Today, many service providers and/or retailers sell audio and/or video content over networks such as the Internet and/or cable television network that has been encoded, for example, using the MPEG encoding standard.

Service providers and/or retailers may also sell ring tones that can be used to customize the audible ring of a cellular phone, for example. Typically, a customer may select a particular ring tone that he or she would like to install from a list of available ring tones. The selected ring tone may then be downloaded over the Internet, for example, and stored on a device, such as a personal computer. The customer may then connect the cellular phone to the device using an input/output (I/O) interface, such as a Universal Serial Bus (USB) port, to install the downloaded ring tone on the cellular phone. Alternatively, the service provider or retailer may wirelessly transmit the selected ring tone to the customer's cellular phone via, for example, a Short Message Service (SMS) message. The cellular phone may decode the SMS message to complete the installation of the ring tone.

SUMMARY OF THE INVENTION

According to some embodiments of the present invention, ring tones can be delivered on a communication network by associating one or more ring tones with a media file, such as a song, that may, for example, be purchased by a customer. The associated ring tones may be presented to a customer to allow the customer to choose which ring tone(s) he/she would like to have as well as to select how the ring tone(s) are to be delivered. For example, the ring tone(s) may be delivered directly to a phone using, for example, a Short Message Service (SMS) message. The ring tone(s) may also be delivered to a storage location, such as on a personal computer, for example, allowing the customer to install the ring tone(s) on his/her phone independently. A key may also be delivered to a storage location that allows the user to invoke the key at later time to trigger delivery of the ring tone(s) over the air via an SMS message.

In particular embodiments of the present invention, ring tones are delivered on a communication network by associating ring tones with media files. A selection of at least one of the media files is received. At least one ring tone associated with the at least one of the media files is selected. The selected at least one of the media files is communicated to a destination. Access to the at least one ring tone that is associated with the selected at least one of the media files is provided.

In other embodiments of the present invention, providing access to the at least one ring tone comprises communicating the at least one ring tone to the destination In other embodiments of the present invention, at least one of the media files is selected at the destination. The at least one ring tone that is associated with the at least one of the media files is played responsive to the selection of the at least one of the media files at the destination.

In still other embodiments of the present invention, providing access to the at least one ring tone comprises communicating an access key for the at least one ring tone to the destination.

In still other embodiments of the present invention, a phone number is received responsive to activation of the access key. The at least one ring tone is communicated to a phone associated with the received phone number.

In still other embodiments of the present invention, a phone number is received. Access to the at least one ring tone comprises communicating the at least one ring tone to a phone associated with the received phone number.

In still other embodiments of the present invention, a price assigned to the at least one ring tone is based on the selection of the at least one of the media files.

In still other embodiments of the present invention, selection of the at least one ring tone comprises at least one of the following: receiving a quantity request for a number of the at least one ring tone; and receiving an audio quality request for the at least one ring tone.

In still other embodiments of the present invention, the audio quality request comprises a selection of either monophonic quality of polyphonic quality.

In still other embodiments of the present invention, a price assigned to the at least one ring tone is based on the selection of the at least one of the media files, the quantity request, the quality request, and/or a user's previous purchases of ring tones and/or media files.

In still other embodiments of the present invention, associating ring tones with media files comprises associating ring tones with media files based on a user's previous purchases of ring tones and/or media files.

In still other embodiments of the present invention, associating ring tones with media files comprises associating ring tones with media files based on a user profile that defines the user's media preferences.

In still other embodiments of the present invention, the selected at least one ring tone has a digital rights management (DRM) measure associated therewith.

In further embodiments of the present invention, a user interface may be provided for delivering ring tones on a communication network. The user interface may operate by presenting at least one media file to a user, the at least one media file having at least one ring tone associated therewith, and presenting a plurality of options for delivering the associated ring tone to a destination.

In still further embodiments of the present invention, presenting a plurality of options comprises presenting an interface for entering a phone number associated with a phone that is the destination.

In still further embodiments of the present invention, presenting a plurality of options comprises presenting an interface for requesting that the associated ring tone be downloaded as a file.

In still further embodiments of the present invention, presenting a plurality of options comprises presenting an interface for requesting downloading of an access key, wherein invocation of the access key provides an interface for entering a phone number associated with a phone that is the destination.

Although described primarily above with respect to method aspects of the present invention, it will be understood that the present invention may also be embodied as systems and/or computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

According to some embodiments of the present invention, ring tones can be delivered on a communication network by associating one or more ring tones with a media file, such as a song, that may, for example, be purchased by a customer. For example, a media content server may provide a user interface for presenting the associated ring tones to a customer to allow the customer to choose which ring tone(s) he/she would like to have as well as to select how the ring tone(s) are to be delivered. The ring tone(s) may be delivered to the customer in various ways. One approach is to deliver the ring tone(s) directly to a phone using, for example, a Short Message Service (SMS) message. The ring tone(s) may also be delivered to a storage location, such as on a personal computer, to allow the customer to install the ring tone(s) on his/her phone independently. A key may also be delivered to a storage location that allows the user to invoke the key at later time to trigger delivery of the ring tone(s) over the air via an SMS message. Thus, some embodiments of the present invention may allow a customer to conveniently acquire ring tone(s) for a wireless phone while obtaining other media content, such as an audio or video file. That is, customers can acquire ring tone(s) along with other media content, such as a song, as part of the same transaction.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. These flowchart and/or block diagrams further illustrate exemplary operations for delivering ring tones on a communication network by associating ring tones with media files, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to associating ring tones with audio files, such as digital music files. It will be understood that the present invention is not limited to such embodiments but may also be embodied generally by associating ring tones with media files, such as, but not limited to, audio files, video files, graphic files and/or text files.

Figure 1:
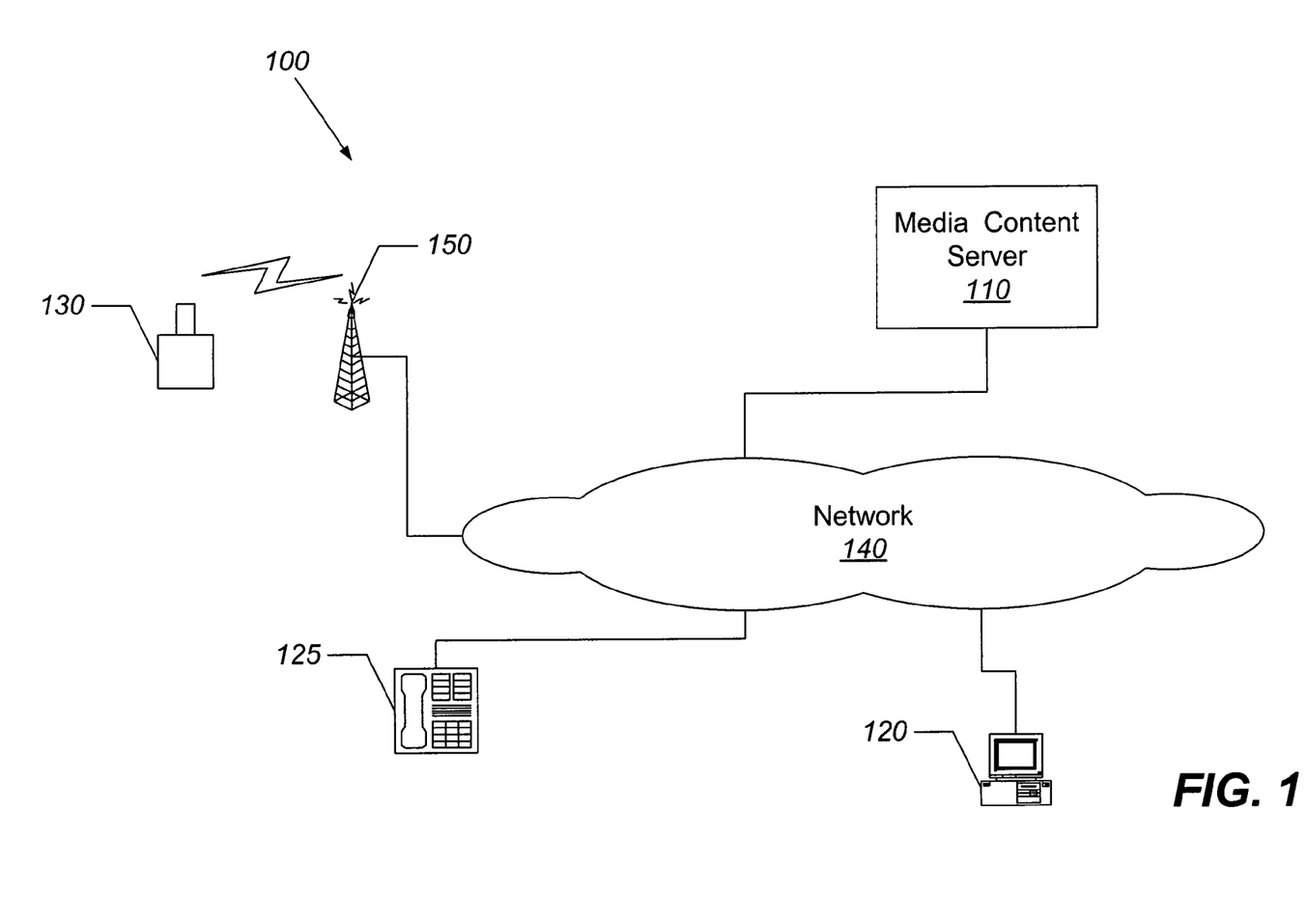
FIG. 1 is a block diagram that illustrates a communication network in accordance with some embodiments of the present invention.

Referring now to FIG. 1, an exemplary network architecture 100 for delivering ring tones on a communication network by associating ring tones with media files, in accordance with some embodiments of the present invention, comprises a media content server 110, a customer premises equipment (CPE) device, such as a personal computer 120, a Voice over IP (VoIP) phone 125, and a wireless phone or mobile terminal 130 that are connected to a network 140 as shown. The network 140 comprises a wireless base station transceiver 150 that may facilitate wireless communication with the wireless phone or mobile terminal 130. The network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN).

As used herein, the terms "wireless phone" or "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Wireless phones and or mobile terminals may also be referred to as "pervasive computing" devices.

The media content server 110 may be configured to associate one or more ring tones with media files, such as, but not limited to, audio, video, graphic, and/or text files for delivery on the communication network 140. As will be described in detail below, the media content server 110 may be configured to present a customer with one or more ring tones that are associated with media files that are available for customer selection. The ring tones may be associated with various media files and/or priced based on business rules, a customer's previous purchases of media files, a customer's previous purchases of ring tones, and/or customer profile information that defines the customer's media preferences. The ring tones may be downloaded to various destinations, including, but not limited to, a customer's computer, e.g., personal computer 120 of FIG. 1, a customer's wireless phone, such as wireless phone 130 of FIG. 1 and/or the VoIP phone 125. The personal computer 120 may, for example, include a soft client thereon that allows the computer to make and receive phone calls. Thus, as used herein, the term "phone" may encompass devices, such as computers, that are configured to make and/or receive phone calls. Advantageously, some embodiments of the present invention may allow a customer to conveniently acquire ring tone(s) for a wireless phone or other device that may use a ring tone while obtaining other media content, such as an audio or video file. Thus, a customer who purchases a particular song from a service provider or retailer that operates a media content server may also obtain a ring tone that corresponds to the song as part of the same transaction.

Some embodiments according to the invention can operate in a logically separated client side/server side-computing environment, sometimes referred to hereinafter as a client/server environment. As shown in FIG. 1, a customer's personal computer 120 and/or mobile terminal 130, i.e., clients, may communicate with the media content server 110, i.e., server, over a wireless and/or wireline communication medium in a client/server context. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Dominos® servers, the Apache server and Microsoft's Internet Information Server (IIS) (Microsoft Corporation, Redmond, Wash.).

The clients and server can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 1 illustrates an exemplary communication network, it will be understood that the present invention is not limited to such configurations, but is intended to encompass any configuration capable of carrying out the operations described herein.

Figure 2:
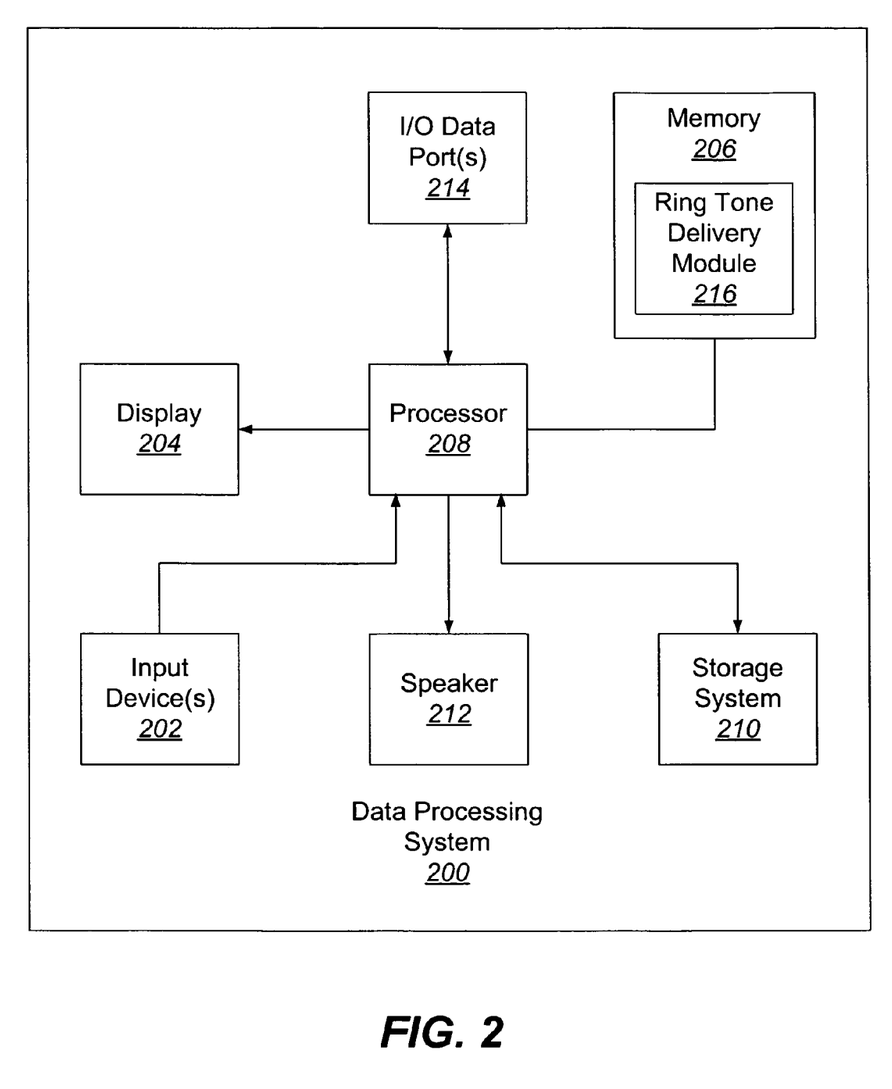
FIG. 2 illustrates a data processing system that may be used to implement a media content server of the communication network of FIG. 1 in accordance with some embodiments of the present invention.

Referring now to FIG. 2, a data processing system 200 that may be used to implement the media content server of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a ring tone distribution module 216 that may be used to distribute ring tones on a communication network by associating ring tones with media files in accordance with some embodiments of the present invention.

Figure 3:
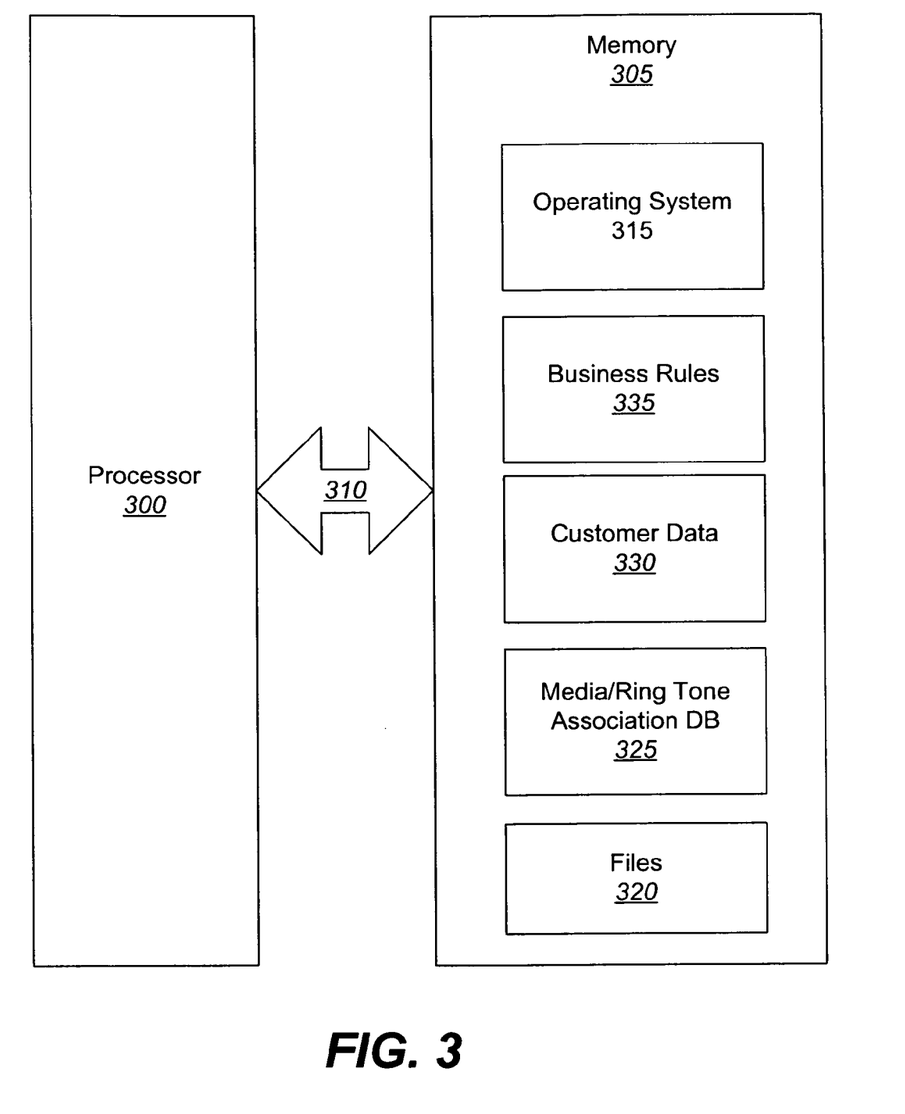
FIG. 3 is a block diagram that illustrates a software/hardware architecture for delivering ring tones on a communication network by associating ring tones with media files in accordance with some embodiments of the present invention.

FIG. 3 illustrates a processor 300 and memory 305 that may be used in embodiments of data processing systems, such as the data processing system 200 of FIG. 2, in which ring tones can be delivered on a communication network by associating the ring tones with media files in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for delivering ring tones on a communication network in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to five or more categories of software and/or data: an operating system 315, media/ring tone files 320, a media/ring tone association database 325, a customer data module 330, and a business rules module 335. The operating system 315 generally controls the operation of the data processing system. In particular, the operating system 315 may manage the data processing system's software and/or hardware resources and may coordinate execution of programs by the processor 300. The media/ring tone association database 325 may be a database and/or a data structure that can be used to create associations between media files and ring tones. The customer data module 330 may include information on customers' previous purchases or behaviors. The customer data module 330 may also include profile information for customers that contains customers' media preferences. Financial accounts for individual customers may also be stored as part of the customer data module 330. The business rules module 335 may contain various rules and algorithms that are used to determine the price structure for the various ring tones. The pricing for ring tones may be based on various factors, including, but not limited to, a particular customer's previous purchases, the particular media that the ring tone(s) are associated with, the quantity requested for a particular ring tone, and/or the quality of the ring tone, e.g., whether the ring tone is monophonic or polyphonic.

Although FIG. 3 illustrates exemplary hardware/software architectures that may be used in data processing systems, such as the data processing system 200 of FIG. 2, for delivering ring tones on a communication network by associating ring tones with media files, it will be understood that the present invention is not limited to such a configuration but is intended to encompass any configuration capable of carrying out operations described herein. Moreover, the functionality of the media content server 110 of FIG. 1, the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for delivering ring tones on a communication network by associating ring tones with media files will now be described with reference to FIGS. 4-7 and 1. Operations begin at block 400 where the media content server 110 detects that a customer has logged in using, for example, the personal computer 120. At block 405, the customer is presented with one or more media files that may be obtained from the media content server 110. As shown in FIG. 5, the media content server 110 may present several songs that are available for downloading via the media server user interface 500. In the example shown in FIG. 5, a customer has requested song 1. In accordance with other embodiments of the present invention, a customer may enter a number in the box next to song 1 if multiple copies of the song are desired.

Figure 6:
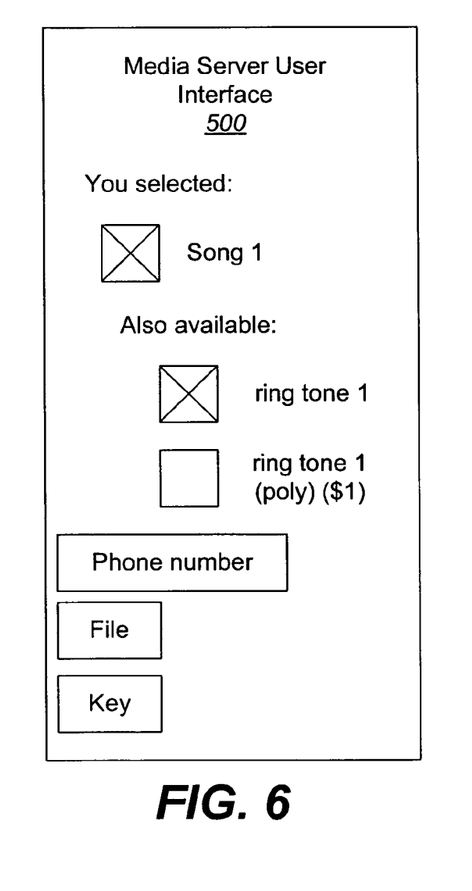

Upon submitting the request for song 1, the customer is presented with one or more ring tones that are associated with the selected media files. As shown in FIG. 6, the media server user interface 500 provides an indication that song 1 has been selected and that there are two ring tones associated with song 1 that are available for purchase: a monophonic ring tone 1 associated with song 1 and a polyphonic ring tone 1 associated with song 1. As discussed above, the ring tones may be free with the purchase of the media file(s) or the ring tones may be priced using business rules (i.e., the business rule module 335) and/or various pricing factors in accordance with some embodiments of the present invention. These factors may include, but are not limited to, a particular customer's previous purchases, the particular media that the ring tone(s) are associated with, the quantity requested for a particular ring tone, and/or the quality of the ring tone, i.e., whether the ring tone is monophonic or polyphonic. In the example shown in FIG. 6, a customer has selected monophonic ring tone 1, which is free with the purchase of song 1. Moreover, in accordance with other embodiments of the present invention, a customer may enter a number in the box next to ring tone 1 if multiple copies of ring tone 1 are desired.

At block 415, the customer is presented with a choice as to how the ring tone(s) are to be delivered. In accordance with various embodiments of the present invention, the media content server 110 may provide access to the ring tone(s) by communicating (e.g., downloading) the ring tone(s) to a destination, such as the personal computer 120. In this case, the customer may select the "File" option provided by the media server user interface 500 of FIG. 6. The customer may then proceed to download the ring tone(s) to a wireless phone, mobile terminal, VoIP phone or the like using conventional techniques. The customer may also use the ring tone(s) on the computer 120, for example, if the computer 120 includes a soft client allowing the computer 120 to make and receive phone calls. Advantageously, the ring tone(s) may play in response to a selection of its associated media file on the destination, e.g., personal computer 120, to effectively provide a preview of the media file. In this way, the media files on the destination may be browsed in an auditory manner.

Figure 7:
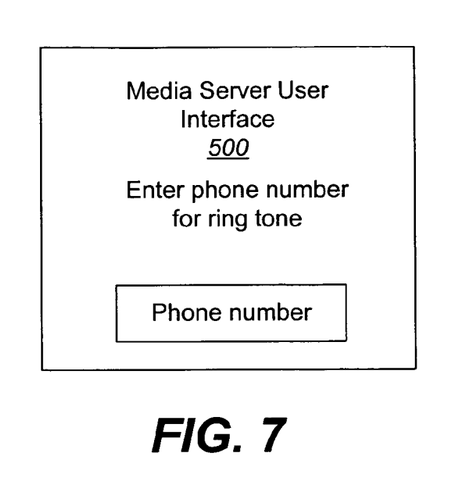

In other embodiments of the present invention, the media content server 110 may provide access to the ring tone(s) by communicating an access key for the ring tone(s) to the destination. In this case, the customer may select the "Key" option provided by the media server user interface 500 of FIG. 6. Upon activation of the access key, the media server user interface 500 may be invoked as shown in FIG. 7 to allow a customer to input a phone number, which is then communicated to the media content server 110. The media server 110 may then download the ring tone(s) to a wireless phone, e.g., wireless phone 130 of FIG. 1, computer 120, VoIP phone 125, or the like that is associated with the phone number. In some embodiments, the ring tone(s) may be downloaded to the wireless phone 130 using an SMS message.

In other embodiments of the present invention, the customer may provide a phone number to the media content server 110 when the ring tone(s) are selected, which the media content sever 110 may use to download the ring tone(s) to the phone associated with the phone number, such as wireless phone 130, computer 120, and/or VoIP phone 125, via, for example, an SMS message. In this case, the customer may enter the phone number in the "Phone number" field provided by the media server user interface 500 of FIG. 6.

At block 420, the customer is provided with access to the ring tone(s) in accordance with the method selected at block 415. In further embodiments of the present invention, the ring tone(s) may be protected through one or more digital rights management (DRM) measures. These DRM measures may restrict the way that a customer may use, reproduce, and/or manipulate the ring tone(s). For example, if the ring tone(s) are downloaded to the computer 120, the DRM measures that are associated with the ring tone(s) may limit transfer of the ring tone(s) to a single device, e.g., the customer's cell phone 130 and may prohibit copying altogether.

The customer may maintain a financial account on the media content server 110 via the customer data module 330 of FIG. 3, which is then updated accordingly based on the media files and associated ring tone(s) that are purchased. Thus, according to some embodiments of the present invention described above, a customer who purchases a particular media file, such as a song, from a service provider or retailer that operates a media content server may also obtain a ring tone that corresponds to the song as part of the same transaction. Embodiments of the present invention have been described above with respect to a customer obtaining one or more ring tones associated with a media file, such as a song, that is being purchased or obtained by the customer. It will be understood that the present invention may also be embodied as obtaining one or more media files, e.g., songs, which are associated with a ring tone when a customer obtains the ring tone.

Figure 4:
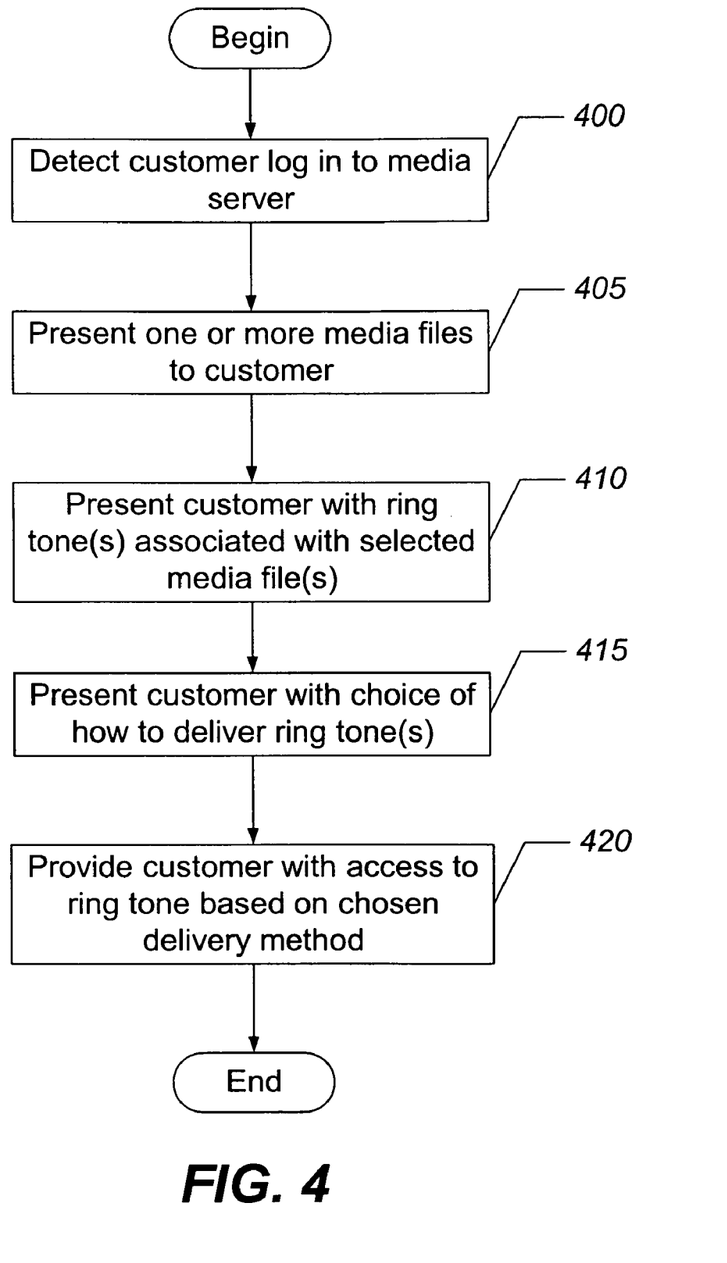
FIG. 4 is a flowchart that illustrates operations for delivering ring tones on a communication network by associating ring tones with media files in accordance with some embodiments of the present invention.
Figure 5:
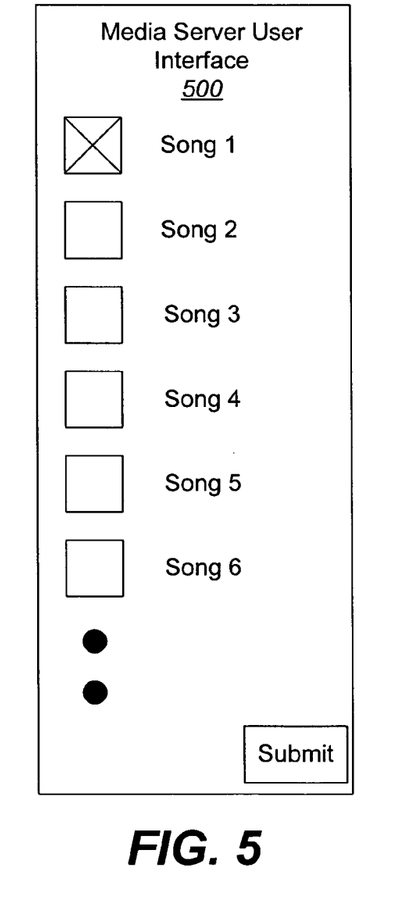
FIGS. 5-7 are block diagrams of user interfaces for delivering ring tones on a communication network in accordance with some embodiments of the present invention.

The flowchart of FIG. 4 illustrates the architecture, functionality, and operations of some embodiments of methods, systems, and computer program products for delivering ring tones on a communication network by associating ring tones with media files. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of delivering ring tones on a communication network, comprising:
    associating ring tone files with media files;
    receiving a first selection of at least one of the media files;
    receiving a second selection of at least one ring tone file associated with the at least one of the media files;
    communicating the selected at least one of the media files to a destination; and providing access to the at least one ring tone file that is associated with the selected at least one of the media files.

2. The method of claim 1, wherein providing access to the at least one ring tone file comprises:
communicating the at least one ring tone file to the destination.

3. The method of claim 2, further comprising:
selecting the at least one of the media files at the destination; and
playing the at least one ring tone file that is associated with the at least one of the media files responsive to the first selection of the at least one of the media files at the destination.

4. The method of claim 1, wherein providing access to the at least one ring tone file comprises:
communicating an access key for the at least one ring tone file to the destination.

5. The method of claim 4, further comprising:
receiving a phone number responsive to activation of the access key; and
communicating the at least one ring tone file to a phone associated with the received phone number.

6. The method of claim 1, further comprising:
receiving a phone number; and
wherein providing access to the at least one ring tone file comprises:
communicating the at least one ring tone file to a phone associated with the received phone number.

7. The method of claim 1, wherein a price assigned to the at least one ring tone file is based on the first selection of the at least one of the media files.

8. The method of claim 1, wherein receiving the second selection of the at least one ring tone file comprises at least one of the following:
receiving a quantity request for a number of the at least one ring tone file; and
receiving an audio quality request for the at least one ring tone file.

9. The method of claim 8, wherein the audio quality request comprises a selection of polyphonic quality.

10. The method of claim 8, wherein a price assigned to the at least one ring tone file is based on the first selection of the at least one of the media files.

11. The method of claim 1, wherein associating ring tone files with media files comprises associating ring tone files with media files based on a customer's previous purchases.

12. The method of claim 1, wherein associating ring tone files with media files comprises associating ring tone files with media files based on a customer profile that defines the customer's media preferences.

13. The method of claim 1, wherein the selected at least one ring tone file has a digital rights management measure associated therewith.

14. A method of operating a user interface for delivering ring tone files on a communication network, comprising:
presenting at least one media file to a user, the at least one media file having at least one ring tone file associated therewith; and
presenting a plurality of options for delivering the associated ring tone file to a destination.

15. The method of claim 14, wherein presenting a plurality of options comprises:
presenting an interface for entering a phone number associated with a phone that is the destination.

16. The method of claim 14, wherein presenting a plurality of options comprises:
presenting an interface for requesting that the associated ring tone file be downloaded as a file.

17. The method of claim 14, wherein presenting a plurality of options comprises:
presenting an interface for requesting downloading of an access key;
wherein invocation of the access key provides an interface for entering a phone number associated with a phone that is the destination.

18. A system for delivering ring tone files on a communication network, comprising:
a content server that is configured to associate ring tone files with media files, receive a first selection of at least one of the media files, receive a second selection of at least one ring tone file associated with the at least one of the media files, and communicate the selected at least one of the media files to a destination such that access is provided to at least one ring tone file that is associated with the selected at least one of the media files.

19. The system of claim 18, wherein the content server is further configured to communicate the at least one ring tone file to the destination.

20. The system of claim 18, wherein the content server is further configured to communicate an access key for the at least one ring tone file to the destination.

21. The system of claim 20, wherein the content server is further configured to receive a phone number responsive to activation of the access key, and communicate the at least one ring tone file to a phone associated with the received phone number.

22. The method of claim 18, wherein the content server is further configured to receive a phone number, and to communicate the at least one ring tone file to a phone associated with the received phone number.

23. A computer program product for delivering ring tone files on a communication network, comprising:
a non-transitory computer readable storage medium having computer readable program code embodied therein, the computer readable program code comprising:
computer readable program code configured to associate ring tone files with media files;
computer readable program code configured to receive a first selection of at least one of the media files;
computer readable program code configured to receive a second selection of at least one ring tone file associated with the at least one of the media files;
computer readable program code configured to communicate the selected at least one of the media files to a destination; and
computer readable program code configured to provide access to at least one ring tone file that is associated with the selected at least one of the media files.

24. The computer program product of claim 23, wherein the computer readable program code configured to provide access to the at least one ring tone file comprises:
computer readable program code configured to communicate the at least one ring tone file to the destination.

25. The computer program product of claim 24, further comprising:
computer readable program code configured to select the at least one of the media files at the destination; and
computer readable program code configured to play the at least one ring tone file that is associated with the at least one of the media files responsive to the selection of the at least one of the media files at the destination.

26. The computer program product of claim 23, wherein the computer readable program code configured to provide access to the at least one ring tone file comprises:
   computer readable program code configured to communicate an access key for the at least one ring tone file to the destination.

27. The computer program product of claim 26, further comprising:
   computer readable program code configured to receive a phone number responsive to activation of the access key; and
   computer readable program code configured to communicate the at least one ring tone file to a phone associated with the received phone number.

28. The computer program product of claim 23, further comprising:
   computer readable program code configured to receive a phone number; and
   wherein the computer readable program code configured to provide access to the at least one ring tone file comprises:
      computer readable program code configured to communicate the at least one ring tone file to a phone associated with the received phone number.

29. The computer program product of claim 23, wherein the computer readable program code configured to receive a second selection of at the least one ring tone file comprises at least one of the following:
   computer readable program code configured to receive a quantity request for a number of the at least one ring tone file; and
   computer readable program code configured to receive an audio quality request for the at least one ring tone file.

30. The computer program product of claim 29, wherein a price assigned to the at least one ring tone file is based on the first selection of the at least one of the media files.

31. The computer program product of claim 23, wherein the computer readable program code configured to associate ring tone files with media files comprises computer readable program code configured to associate ring tone files with media files based on a customer's previous purchases.

32. The computer program product of claim 23, wherein the computer readable program code configured to associate ring tone files with media files comprises computer readable program code configured to associate ring tone files with media files based on a customer profile that defines the customer's media preferences.

33. A computer program product operating a user interface for delivering ring tone files on a communication network, comprising:
   a computer readable storage medium having computer readable program code embodied therein, the computer readable program code comprising:
   computer readable program code configured to present at least one media file to a user, the at least one media file having at least one ring tone file associated therewith; and
   computer readable program code configured to present a plurality of options for delivering the associated ring tone file to a destination.

34. The computer program product of claim 33, wherein the computer readable program code configured to present a plurality of options comprises:
   computer readable program code configured to present an interface for entering a phone number associated with a phone that is the destination.

35. The computer program product of claim 33, wherein the computer readable program code configured to present a plurality of options comprises:
   computer readable program code configured to present an interface for requesting that the associated ring to tone file be downloaded as a file.

36. The computer program product of claim 33, wherein the computer readable program code configured to present a plurality of options comprises:
   computer readable program code configured to present an interface for requesting downloading of an access key;
      wherein invocation of the access key provides an interface for entering a phone number associated with a phone that is the destination.

* * * * *